(12) United States Patent
Docy

(10) Patent No.: US 9,078,413 B1
(45) Date of Patent: Jul. 14, 2015

(54) DEVICE FOR CLEANING PETS IN COOPERATION WITH A PET DOOR

(71) Applicant: Kevin M. Docy, Akron, OH (US)

(72) Inventor: Kevin M. Docy, Akron, OH (US)

( * ) Notice: Subject to any disclaimer, the term of this patent is extended or adjusted under 35 U.S.C. 154(b) by 112 days.

(21) Appl. No.: 13/721,872

(22) Filed: Dec. 20, 2012

(51) Int. Cl.
*A01K 13/00* (2006.01)

(52) U.S. Cl.
CPC ............ *A01K 13/001* (2013.01); *A01K 13/00* (2013.01); *A01K 13/004* (2013.01)

(58) Field of Classification Search
CPC . A01K 13/003; A01K 13/004; A01K 15/024; A01K 13/00
USPC ......... 119/652, 661, 662, 663, 664, 667, 669, 119/671, 621, 622
See application file for complete search history.

(56) References Cited

U.S. PATENT DOCUMENTS

| | | | | |
|---|---|---|---|---|
| 1,582,144 A * | 4/1926 | Pflaum | ........................ | 119/658 |
| 1,627,516 A * | 5/1927 | Larson | ........................ | 119/656 |
| 2,809,406 A * | 10/1957 | Walter | ........................ | 422/292 |
| 2,945,474 A * | 7/1960 | McIntyre | ........................ | 119/603 |
| 2,976,841 A * | 3/1961 | Scheffer | ........................ | 119/622 |
| 4,083,328 A | 4/1978 | Baker | | |
| 4,930,453 A | 6/1990 | Laliberte | | |
| 4,943,018 A * | 7/1990 | Glaser et al. | ........................ | 248/110 |
| 5,678,259 A * | 10/1997 | Cruz, Jr. | ........................ | 4/622 |
| 5,755,183 A * | 5/1998 | Udelle et al. | ........................ | 119/622 |
| 5,782,206 A * | 7/1998 | Markowitz | ........................ | 119/622 |
| 6,146,588 A * | 11/2000 | Deighton | ........................ | 422/28 |
| 7,000,569 B2 * | 2/2006 | Markowitz | ........................ | 119/622 |
| 7,100,538 B2 | 9/2006 | Motomura | | |
| 7,107,937 B1 | 9/2006 | Anderson | | |
| 7,198,007 B2 | 4/2007 | Bestelmeyer | | |
| 7,284,502 B1 * | 10/2007 | Dotter | ........................ | 119/484 |
| 7,784,430 B1 | 8/2010 | Thorne et al. | | |
| 2002/0139313 A1 | 10/2002 | Mack et al. | | |
| 2007/0039558 A1 * | 2/2007 | Hensley | ........................ | 119/621 |
| 2010/0282182 A1 | 11/2010 | Moinester | | |
| 2011/0232579 A1 | 9/2011 | Clayson | | |
| 2012/0137984 A1 * | 6/2012 | Haaf | ........................ | 119/601 |
| 2012/0222627 A1 * | 9/2012 | Chura | ........................ | 119/622 |
| 2013/0269626 A1 * | 10/2013 | Navran | ........................ | 119/621 |

FOREIGN PATENT DOCUMENTS

JP       2003023898 A *    1/2003    ............ A01K 13/00

* cited by examiner

*Primary Examiner* — Son T Nguyen
(74) *Attorney, Agent, or Firm* — Richard L. Miller

(57) ABSTRACT

A pet cleaning device that rests on a support surface, replaceably attaches around, and communicates with, a pet door, and isolates and cleans a pet after the pet has passed through the pet door. The pet cleaning device includes a tunneled enclosure, and a pair of side cleaning pads. The tunneled enclosure rests on the support surface, replaceably attaches around, and communicates with, the pet door, and isolates the pet. The pair of side cleaning pads are operatively connected to, and within, the tunneled enclosure, and clean the pet after the pet has passed through the pet door and has advanced to between the pair of side cleaning pads.

43 Claims, 4 Drawing Sheets

DEVICE FOR CLEANING PETS IN COOPERATION WITH A PET DOOR

1. BACKGROUND OF THE INVENTION

A. Field of the Invention.

The embodiments of the present invention relate to a pet cleaning device, and more particularly, the embodiments of the present invention relate to a pet cleaning device for resting on a support surface, for replaceably attaching around, and communicating with, a pet door, and for isolating and cleaning a pet after the pet has passed through the pet door.

B. Description of the Prior Art.

Numerous innovations for pet cleaning devices have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a pet cleaning device for resting on a support surface, for replaceably attaching around, and communicating with, a pet door, and for isolating and cleaning a pet after the pet has passed through the pet door.

(1) U.S. Pat. No. 4,083,328 to Baker

U.S. Pat. No. 4,083,328—issued to Baker on Apr. 11, 1978 in U.S. class 119 and subclass 673—teaches a rigid tub having an outlet hose affixed to the bottom thereof extending from an outlet hole for draining the tub. An outlet cap on the outlet hose manually controls the flow of fluid through the hose. A flexible bag has a body opening and a head opening formed therethrough, and a zipper extending along the body opening to the head opening for selectively opening and closing the body opening to position a pet therein, with its head extending beyond the bag through the head opening. A first fastening device releasably affixes the bag to the tub in a manner whereby the bag covers the tub and extends a distance thereabove. An inlet in the bag admits solids and fluids into the bag onto a pet in the tub. A pair of spaced hand holes are formed through the bag. Each of a pair of sleeves extends from the bag at a corresponding one of the hand holes for accommodating the arms of a user washing a pet in the tub.

(2) U.S. Pat. No. 4,930,453 to Laliberte

U.S. Pat. No. 4,930,453—issued to Laliberte on Jun. 5, 1990 in U.S. class 119 and subclass 671—teaches a device for washing small animals that includes a base having a floor sloping toward a drain. A screen covers the drain for trapping loose animal hair, and a grate overlies the floor for supporting an animal to be washed. A dome formed from a transparent material is removably retained by a plurality of latches on the base for confining an animal. An opening formed in one end of the dome is dimensioned to receive a small animal's head through a slit in a rubber sheet covering the opening. A plurality of circular apertures are provided in the dome to receive a pair of glove inserts in various locations for conveniently washing an animal within the dome. A plurality of cover plates are provided for closing the circular apertures not currently in use. Each of the circular apertures includes a radially extending lip and an adjacent undercut groove for engagement with a resilient sealing disc of the glove inserts or the cover plates. In a second embodiment, the base and dome may be formed from two telescoping sections for adjusting the device for various different sizes of animals. The small animal washing device may be utilized as a carrying case for transporting animals.

(3) United States Patent Application Publication Number 2002/0139313 to Mack Jr. et al United States Patent Application Publication Number 2002/0139313—published to Mack Jr. et al. on Oct. 3, 2002 in U.S. class 119 and subclass 165—teaches a pet debris trap that catches items that result from traffic to a pet usage area, such as a cat litter box, or from a pet habitat, such as a birdcage. In situations such as this, debris in the form of cat litter, feces, food particles, replaced feathers, etc. is deposited around the litter box or habitat. This presents a condition that requires constant attention by the pet owner. A trap includes a substratum that supports an adhesive, preferably a pressure sensitive adhesive, that is supported by, and positioned up away from, a base. This accessible adhesive catches litter that clings to the paws of a cat or droppings from a bird that would otherwise soil the bottom pan of the cage or bounce out of the cage and land on the floor nearby. The adhesive covered substratum can come in individual sheets or on a continuous roll, which can then be discarded when soiled and replaced with a clean sheet or section of the roll.

(4) U.S. Pat. No. 7,100,538 to Motomura

U.S. Pat. No. 7,100,538—issued to Motomura on Sep. 5, 2006 in U.S. class 119 and subclass 671—teaches s pet washing and drying apparatus.

(5) U.S. Pat. No. 7,107,937 to Anderson

U.S. Pat. No. 7,107,937—issued to Anderson on Sep. 19, 2006 in U.S. class 119 and subclass 671—teaches a pet washing assembly that includes a housing having a bottom wall, a top wall, a first lateral wall, a second lateral wall, a back wall, and a front wall. The front wall has a door therein for selectively positioning a dog into an interior of the housing. The door has an aperture extending therethrough that is adapted for receiving a head of the dog. A water inlet tube extends through the back wall. A plurality of supply tubes are positioned within the housing, and each is fluidly coupled to the inlet tube. A plurality of nozzles are mounted with the housing. Each of the nozzles is fluidly coupled to one of the supply tubes.

(6) U.S. Pat. No. 7,198,007 to Bestelmeyer

U.S. Pat. No. 7,198,007—issued to Bestelmeyer on Apr. 3, 2007 in U.S. class 119 and subclass 673—teaches a perforated intermediate bottom located inside a tub-like basin. The basin is filled with water to a level higher than the intermediate bottom until the paws are submerged. Air is injected, preferably in a lateral and/or downward manner, out of a first branch of an air supply system into the water by a blower. The branch is located underneath the intermediate bottom. The air is distributed in the water, and the pressure thereof is sufficient for removing dirt adhering to the paws by bubbling and without spraying. After a cleaning phase, the pressure of the compressed air is maintained in the first branch, as long as it is immersed in the water, at a level sufficient for preventing dirt from entering the air outflow openings. During a drying phase, a second branch of the air supply system is supplied with air. The second branch is provided with at least one outlet opening for drying air.

(7) U.S. Pat. No. 7,784,430 to Thorne et al

U.S. Pat. No. 7,784,430—issued to Thorne et al. on Aug. 31, 2010 in U.S. class 119 and subclass 484—teaches a door section for fitting in a sliding door frame is, preferably, made of plastic, e.g., PVC. The door section contains a built in pet door. The door section is formed by tubular sides and cross members, and has plastic brackets that press fit within the tubular members, and, preferably, also may be screwed in place or otherwise fixed in place, e.g., using epoxy, or both screws and epoxy. The door section has brackets on its side edges for hanging or connecting to the inside of the sliding door frame, and the door section may also have a bracket or catch on the other side edge from which the door section connects to the frame. This bracket or catch is for the existing sliding door's lock. Preferably, insulation strips are provided, and, preferably, an H-shaped vertical section may fit on top of the door section and inside the frame for a fit with less play and for a smoother or cleaner look. Rubber or rubbery elements may be placed over the sliding door's bottom track for the door section to sit more securely. The door section, preferably, also has a glass or other clear material in it above the pet door.

(8) United States Patent Application Publication Number 2010/0282182 to Moinester United States Patent Application Publication Number—published 2010/0282182 to Moinester on Nov. 11, 2010 in U.S. class 119 and subclass 604—teaches portable apparatus and systems for pet bathing. According to one embodiment, a fully contained portable pet washing system includes one or more collapsible fluid bladders, one or more fluid tubes, a variable flow control valve, a bladder holder pack, and a detachable fabric-based wash glove. The fluid tubes interface with the collapsible fluid bladders. The variable flow control valve is operable to control the dispensing of washing or rinsing fluid from the collapsible fluid bladders. The bladder holder pack is configured to be fastened as an adjustable waist belt, and configured to enclose some portion of the collapsible fluid bladders. The detachable fabric-based wash glove includes at least a portion of an attachment mechanism for engaging the fluid tubes and maintaining the positioning thereof to dispense the washing or rinsing fluid at a location near a palm or finger portion of the detachable fabric-based wash glove.

(9) United States Patent Application Publication Number 2011/0232579 to Clayson

United States Patent Application Publication Number 2011/0232579—published to Clayson on Sep. 29, 2011 in U.S. class 119 and subclass 622—teaches a brush that is mounted on a typical flap-style pet door. As the pet uses the pet door, the brush automatically sweeps dirt, loose hair, leaves, grass, allergens, or other debris off the pet. The result is both a cleaner pet and a cleaner house, as the debris may be brushed off the pet prior to the pet entering the house. The pet owner need not be present for the brush to reap its benefits.

It is apparent that numerous innovations for pet cleaning devices have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a pet cleaning device for resting on a support surface, for replaceably attaching around, and communicating with, a pet door, and for isolating and cleaning a pet after the pet has passed through the pet door.

2. SUMMARY OF THE INVENTION

Thus, an object of the embodiments of the present invention is to provide a pet cleaning device for resting on a support surface, for replaceably attaching around, and communicating with, a pet door, and for isolating and cleaning a pet after the pet has passed through the pet door, which avoids the disadvantages of the prior art.

Briefly stated, another object of the embodiments of the present invention is to provide a pet cleaning device that rests on a support surface, replaceably attaches around, and communicates with, a pet door, and isolates and cleans a pet after the pet has passed through the pet door. The pet cleaning device includes a tunneled enclosure, and a pair of side cleaning pads. The tunneled enclosure rests on the support surface, replaceably attaches around, and communicates with, the pet door, and isolates the pet. The pair of side cleaning pads are operatively connected to, and within, the tunneled enclosure, and clean the pet after the pet has passed through the pet door and has advanced between the pair of side cleaning pads.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows:

FIG. 1 is a diagrammatic perspective view of the pet cleaning device of the embodiments of the present invention resting on a support surface, replaceably attaching around, and communicating with, a pet door, and isolating and cleaning a pet after the pet has passed through the pet door, FIG. 2 is an enlarged diagrammatic side elevational view taken generally in the direction of ARROW 2 in FIG. 1 of the pet cleaning device of the embodiments of the present invention resting on a support surface, replaceably attaching around, and communicating with, a pet door, and isolating and cleaning a pet after the pet has passed through the pet door, FIG. 3 is a reduced diagrammatic perspective view of the pet cleaning device of the embodiments of the present invention identified by ARROW 3 in FIGS. 1 and 2;

Figure 3:
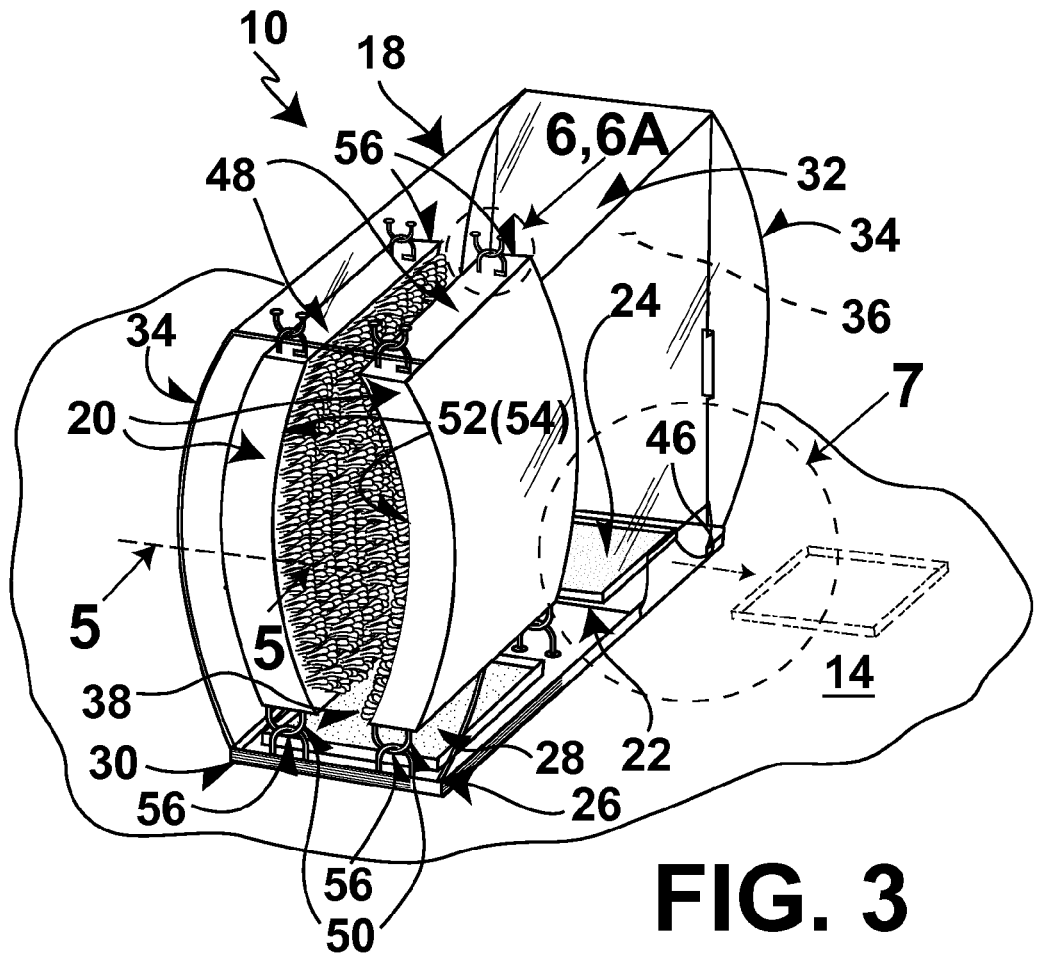
Figure 6:
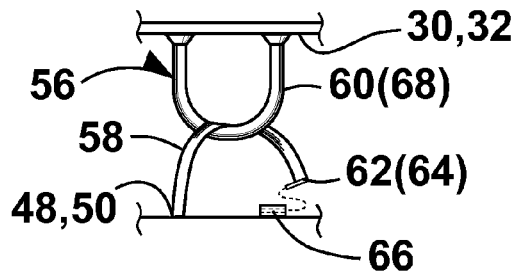
FIG. 6 is an enlarged diagrammatic front elevational view of the area generally enclosed by the dotted circle identified by ARROW 6 in FIG. 3 of the cooperating hooks and loops of the pet cleaning device of the embodiments of the present invention unlocked.
Figure 6A:
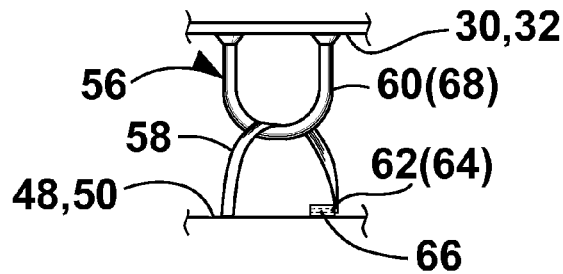
Figure 7:
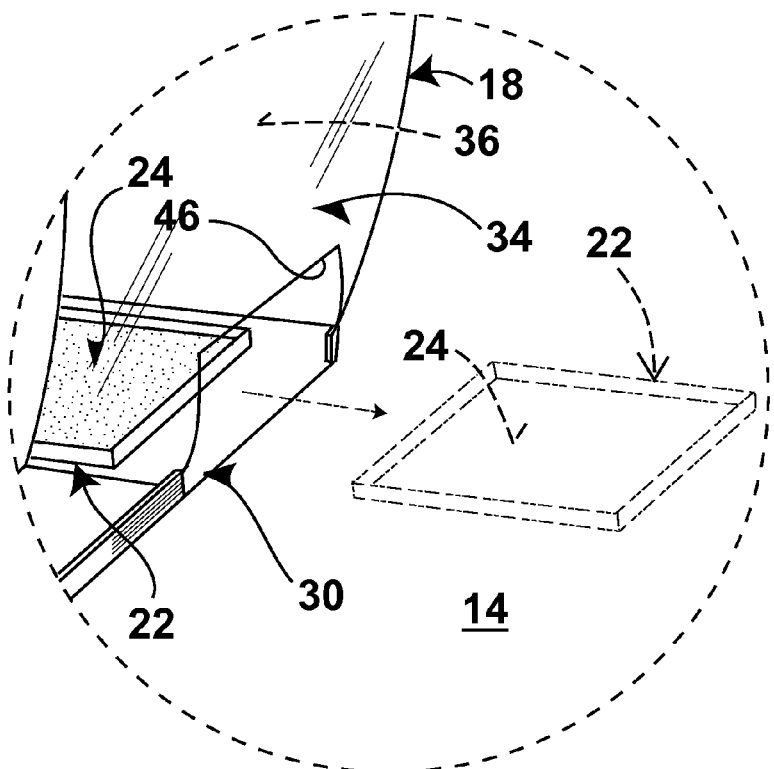

FIG. 6A is an enlarged diagrammatic front elevational view of the area generally enclosed by the dotted circle identified by ARROW 6A in FIG. 3 of the cooperating hooks and loops of the pet cleaning device of the embodiments of the present invention locked; and FIG. 7 is an enlarged diagrammatic perspective view of the area generally enclosed by the dotted circle identified by ARROW 7 in FIG. 3 of the rear tray of the pet cleaning device of the embodiments of the present invention.

4. LIST OF REFERENCE NUMERALS UTILIZED IN THE FIGURES OF THE DRAWING

A. Introductory.
10 pet cleaning device of embodiments of present invention for resting on support surface 14, for replaceably attaching around, and communicating with, pet door 12, and for isolating and cleaning pet 16 after pet 16 has passed through pet door 12
12 pet door
14 support surface
16 pet
B. Configuration of Pet Cleaning Device 10.
18 tunneled enclosure for resting on support surface 14, for replaceably attaching around, and communicating with pet door 12, and for isolating pet 16
20 pair of side cleaning pads for cleaning pet 16 after pet 16 has passed through pet door 12 and has advanced to between pair of side cleaning pads 20
22 rear tray
24 replaceable wet sponge of rear tray 22 for washing paws of pet 16 as pet 16 passes thereby and steps therein
26 front tray
28 replaceable dry sponge of front tray 26 for drying paws of pet 16 that have been wetted by wet sponge 24 of rear tray 22 as pet 16 passes thereby and step therein
C. Configuration of Tunneled Enclosure 18.
30 bottom wall of tunneled enclosure 18 for resting on support surface 14
32 top wall of tunneled enclosure 18
34 pair of side walls of tunneled enclosure 18
36 back of tunneled enclosure 18 for replaceably attaching around pet door 12
38 front of tunneled enclosure 18 for allowing pet 16 to exit tunneled enclosure 18 therethrough
40 opening of back 36 of tunneled enclosure 18
42 pair of tracks of back 36 of tunneled enclosure 18
44 pair of cooperating tracks of tunneled enclosure 18
46 opening in one side wall of pair of side walls 34 of tunneled enclosure 18
D. Configuration of Pair of Side Cleaning Pads 20.
48 tops of pair of side cleaning pads 20, respectively
50 bottoms of pair of side cleaning pads 20, respectively
52 facing surfaces of pair of side cleaning pads 20, respectively
54 microfiber fingers of facing surfaces 52 of pair of side cleaning pads 20, respectively, for facilitating cleaning pet 16 when pet 16 passes between pair of side cleaning pads 20
56 four pair of hook and loop connectors of pair of side cleaning pads 20 for facilitating cleaning pet 16 when pet 16 passes between pair of side cleaning pads 20 by having pair of side cleaning pads 20 biased against pet 16
E. Configuration of Four Pair of Hook and Loop Connectors 56 of Pair of Side Cleaning Pads 20.
58 hook portion of each hook and loop connector of two pair of hook and loop connectors 56 of pair of side cleaning pads 20
60 loop portion of each hook and loop connector of two pair of hook and loop connectors 56 of pair of side cleaning pads 20
62 one end of each hook portion 58 of each hook and loop connector of two pair of hook and loop connectors 56 of pair of side cleaning pads 20
64 male connector portion of one end of each hook portion 58 of each hook and loop connector of two pair of hook and loop connectors 56 of pair of side cleaning pads
66 female connector portion of each hook and loop connector of two pair of hook and loop connectors 56 of pair of side cleaning pads 20
68 elastic cord of loop portion 60 of each hook and loop connector of two pair of hook and loop connectors 56 of pair of side cleaning pads 20 for facilitating cleaning pet 16 when pet 16 passes between pair of side cleaning pads 20 by having pair of side cleaning pads 20 biased against pet 16

5. DETAILED DESCRIPTION OF THE PREFERRED EMBODIMENTS

A. Introductory.

Figure 1:
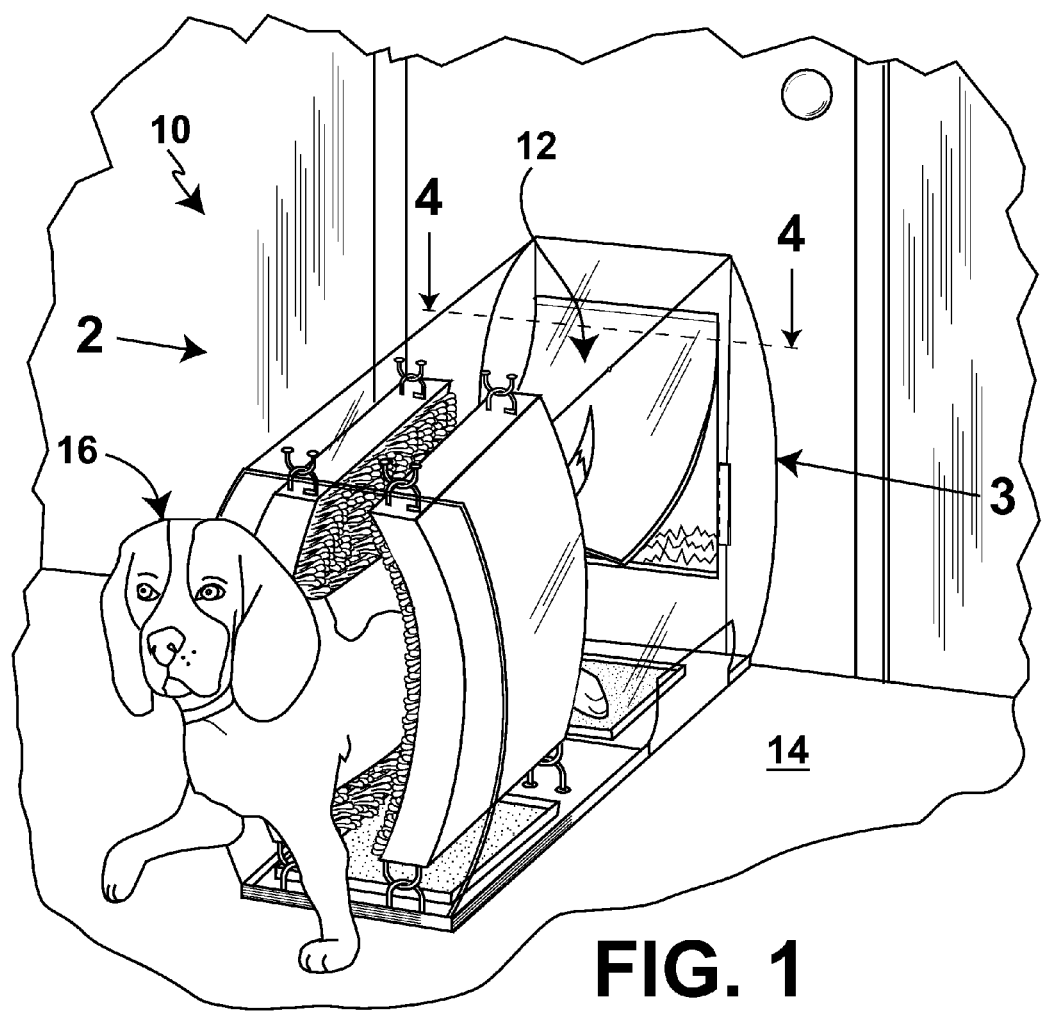
Figure 2:
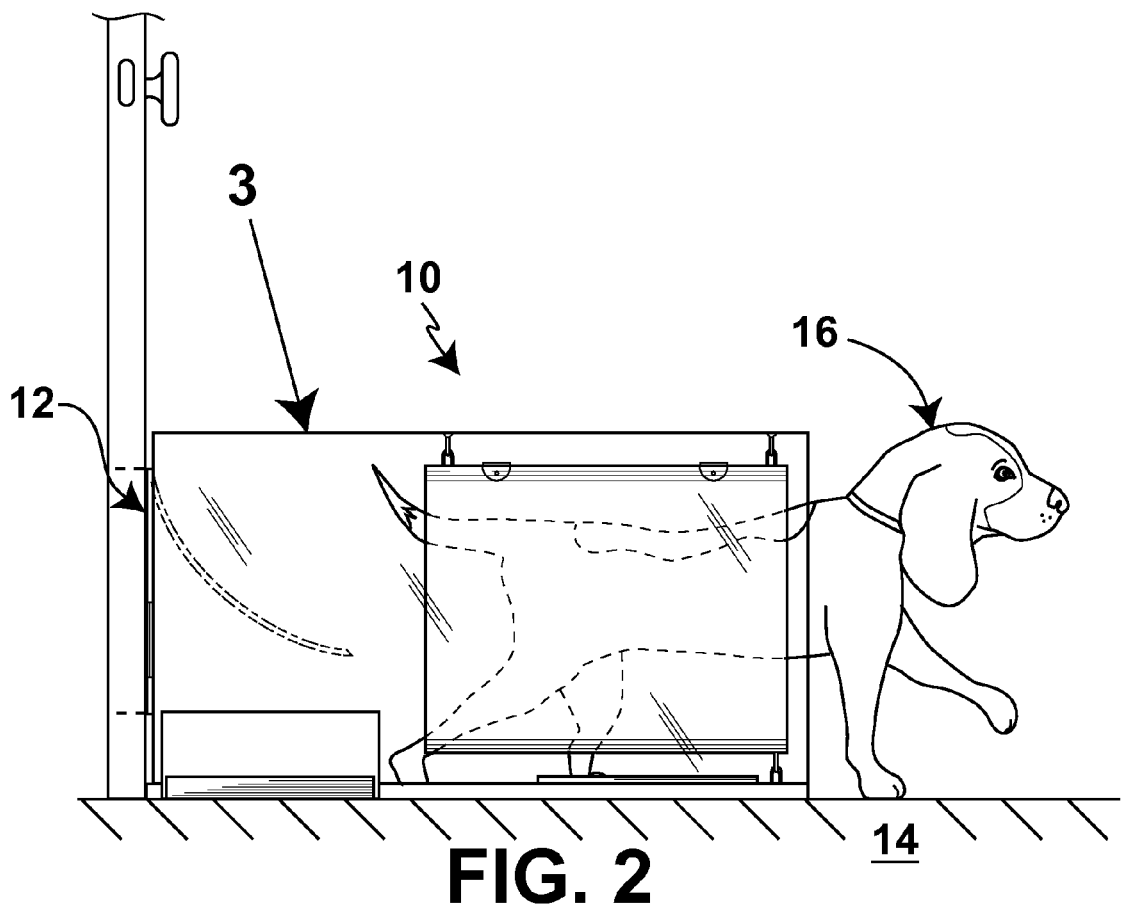

Referring now to the figures, in which like numerals indicate like parts, and particularly to FIGS. 1 and 2, which are, respectively, a diagrammatic perspective view of the pet cleaning device resting on a support surface, replaceably attaching around, and communicating with, a pet door, and isolating and cleaning a pet after the pet has passed through the pet door, and an enlarged diagrammatic side elevational view taken generally in the direction of ARROW 2 in FIG. 1 of the pet cleaning device of the embodiments of the present invention resting on a support surface, replaceably attaching around, and communicating with, a pet door, and isolating and cleaning a pet after the pet has passed through the pet door, the pet cleaning device of the embodiments of the present invention is shown generally at 10 for resting on a support surface 14, for replaceably attaching around, and communicating with, a pet door 12, and for isolating and cleaning a pet 16 after the pet 16 has passed through the pet door 12.

B. Configuration of the Pet Cleaning Device 10.

The configuration of the pet cleaning device 10 can best be seen in FIG. 3, which is a reduced diagrammatic perspective view of the pet cleaning device of the embodiments of the present invention identified by ARROW 3 in FIGS. 1 and 2, and as such, will be discussed with reference thereto.

The pet cleaning device 10 comprises a tunneled enclosure 18, and a pair of side cleaning pads 20. The tunneled enclosure 18 is for resting on the support surface 14, for replaceably attaching around, and communicating with the pet door 12, and for isolating the pet 16. The pair of side cleaning pads 20 are operatively connected to, and within, the tunneled enclosure 18, and are for cleaning the pet 16 after the pet 16 has passed through the pet door 12 and has advanced to between the pair of side cleaning pads 20.

The pet cleaning device 10 further comprises a rear tray 22.

The rear tray 22 is slidably attached within the tunneled enclosure 18.

The rear tray 22 removably receives a replaceable wet sponge 24.

The replaceable wet sponge 24 of the rear tray 22 removably sits in the rear tray 22, and is for washing the paws of the pet 16 as the pet 16 passes thereby and steps therein.

The pet cleaning device 10 further comprises a front tray 26.

The front tray 26 is slidably attached within the tunneled enclosure 18.

The front tray 26 removably receives a replaceable dry sponge 28.

The replaceable dry sponge 28 of the front tray 26 removably sits in the front tray 26, and is for drying the paws of the pet 16 that have been wetted by the wet sponge 24 of the rear tray 22 as the pet 16 passes thereby and steps therein.

C. Configuration of the Tunneled Enclosure 18.

Figure 4:
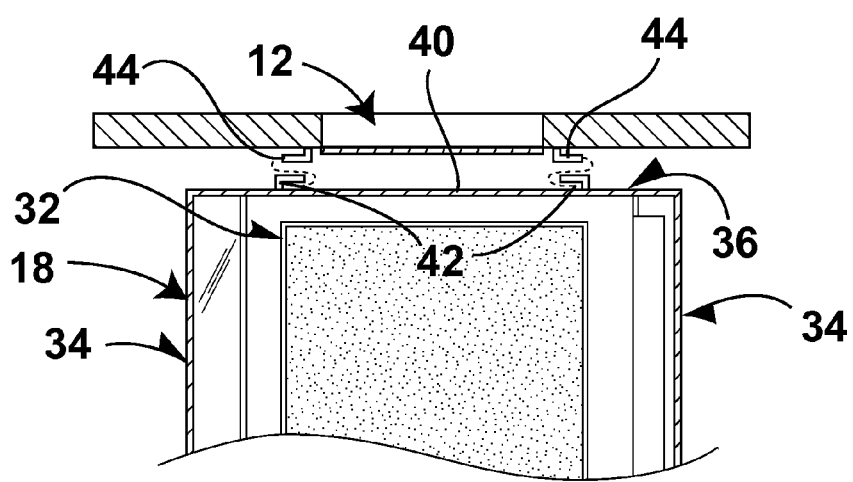
FIG. 4 is an enlarged diagrammatic cross sectional view taken along LINE 4-4 in FIG. 1 of the attaching system of the pet cleaning device of the embodiments of the present invention.

The configuration of the tunneled enclosure 18 can best be seen in FIGS. 3, 4, and 7, which are, respectively, again, a reduced diagrammatic perspective view of the pet cleaning device of the embodiments of the present invention identified by ARROW 3 in FIGS. 1 and 2, an enlarged diagrammatic cross sectional view taken along LINE 4-4 in FIG. 1 of the attaching system of the pet cleaning device of the embodiments of the present invention, and an enlarged diagrammatic perspective view of the area generally enclosed by the dotted circle identified by ARROW 7 in FIG. 3 of the rear tray of the pet cleaning device of the embodiments of the present invention, and as such, will be discussed with reference thereto.

The tunneled enclosure 18 comprises a bottom wall 30, a top wall 32, a pair of side walls 34, a back 36, and a front 38.

The bottom wall 30 of the tunneled enclosure 18 is flat, and is for resting on the support surface 14.

The top wall 32 of the tunneled enclosure 18 is flat, and is disposed above, is parallel to, and is aligned with, the bottom wall 30 of the tunneled enclosure 18.

The pair of side walls 34 of the tunneled enclosure 18 are spaced-apart from each other, bow outwardly away from each other, are mirror images of each other, and connect the bottom wall 30 of the tunneled enclosure 18 to the top wall 32 of the tunneled enclosure 18.

The back 36 of the tunneled enclosure 18 is for replaceably attaching around the pet door 12, and has an opening 40 that communicates with the pet door 12 when the pet door 12 has been opened by the pet 16 passing therethrough.

As best shown in FIG. 4, the back 36 of the tunneled enclosure 18 has a pair of tracks 42.

As best shown further in FIG. 4, the pair of tracks 42 of the back 36 of the tunneled enclosure 18 are vertically oriented, are spaced-apart from each other, are mirror images of each other, are generally L-shaped, open towards each other, and straddle the opening 40 in the back 36 of the tunneled enclosure 18.

As best shown further in FIG. 4, the tunneled enclosure 18 further comprises a pair of cooperating tracks 44.

As best shown further in FIG. 4, the pair of cooperating tracks 44 of the tunneled enclosure 18 are vertically oriented, are spaced-apart from each other, are mirror images of each other, are generally L-shaped, open away from each other, straddle the pet door 12, and slidably receive the pair of tracks 42 of the back 36 of the tunneled enclosure 18 so as to allow the tunneled enclosure 18 to be slid down and communicate with the pet door 12 and be readily removable from around the pet door 12.

As best shown in FIG. 7, one side wall 34 of the tunneled enclosure 18 has an opening 46.

As best shown further in FIG. 7, the opening 46 in the one side wall 34 of the tunneled enclosure 18 extends partially upwardly from the bottom wall 30 of the tunneled enclosure 18 and partially forwardly from the back 36 of the tunneled enclosure 18, and provides access to service the rear tray 22.

The front wall 38 of the tunneled enclosure 18 is opened for allowing the pet 16 to exit the tunneled enclosure 18 therethrough.

D. Configuration of the Pair of Side Cleaning Pads 20.

The configuration of the pair of side cleaning pads 20 can best be seen in FIGS. 3 and 5, which are, respectively, again, a reduced diagrammatic perspective view of the pet cleaning device of the embodiments of the present invention identified by ARROW 3 in FIGS. 1 and 2, and an enlarged diagrammatic cross sectional view taken along LINE 5-5 in FIG. 3 of the pad of the pet cleaning device of the embodiments of the present invention, and as such, will be discussed with reference thereto.

The pair of side cleaning pads 20 bow outwardly away from each other, are mirror images of each other, open towards each other, are aligned with each other, are spaced-apart from each other for allowing the pet 16 to pass therebetween and be cleaned thereby, and have tops 48, bottoms 50, and facing surfaces 52, respectively.

Figure 5:
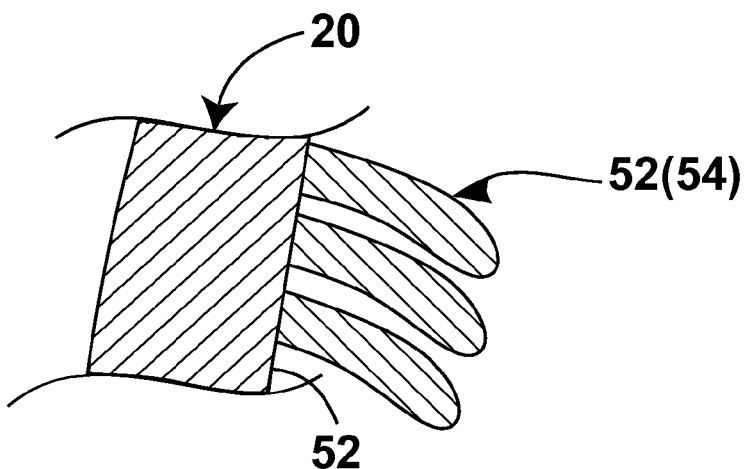
FIG. 5 is an enlarged diagrammatic cross sectional view taken along LINE 5-5 in FIG. 3 of the pad of the pet cleaning device of the embodiments of the present invention.

As best shown in FIG. 5, the facing surfaces 52 of the pair of side cleaning pads 20, respectively, are microfiber fingers 54 for facilitating cleaning the pet 16 when the pet 16 passes between the pair of side cleaning pads 20.

The pair of side cleaning pads 20 further comprises four pair of hook and loop connectors 56.

The four pair of hook and loop connectors 56 of the pair of side cleaning pads 20 suspend the pair of side cleaning pads 20 within the tunneled enclosure 18, and maintain the pair of side cleaning pads 20 in static equilibrium and biased towards each other for facilitating cleaning the pet 16 when the pet 16 passes between the pair of side cleaning pads 20 by having the pair of side cleaning pads 20 biased against the pet 16.

Two pair of hook and loop connectors 56 of the pair of side cleaning pads 20 depend from the top wall 32 of the tunneled enclosure 18 to the tops 48 of the pair of side cleaning pads 20, respectively, and the other two pair of hook and loop connectors 56 of the pair of side cleaning pads 20 depend from the bottoms 50 of the pair of side cleaning pads 20, respectively, to the bottom wall 30 of the tunneled enclosure 18.

In order to access the front tray 26, a forwardmost-lowermost pair of hook and loop connectors 56 of the pair of side cleaning pads 20 must be unhooked.

E. Configuration of the Four Pair of Hook and Loop Connectors 56 of the Pair of Side Cleaning Pads 20.

The configuration of the four pair of hook and loop connectors 56 of the pair of side cleaning pads 20 can best be seen in FIGS. 6 and 6A, which are, respectively, an enlarged diagrammatic front elevational view of the area generally enclosed by the dotted circle identified by ARROW 6 in FIG. 3 of the cooperating hooks and loops of the pet cleaning device of the embodiments of the present invention unlocked, and an enlarged diagrammatic front elevational view of the area generally enclosed by the dotted circle identified by ARROW 6A in FIG. 3 of the cooperating hooks and loops of the pet cleaning device of the embodiments of the present invention locked, and as such, will be discussed with reference thereto.

Each hook and loop connector 56 of the pair of side cleaning pads 20 comprises a hook portion 58 and a loop portion 60.

The hook portion 58 of each hook and loop connector 56 of the pair of side cleaning pads 20 are disposed on the tops 48 of the pair of side cleaning pads 20 and the bottoms 50 of the pair of side cleaning pads 20, respectively.

The loop portion 60 of each hook and loop connector 56 of the pair of side cleaning pads 20 are disposed on the top wall 32 of the tunneled enclosure 18 and the bottom wall 30 of the tunneled enclosure 18, respectively.

Each hook portion 58 of each hook and loop connector 56 of the pair of side cleaning pads 20 has one end 62 thereof replaceably attached to the tops 48 of the pair of side cleaning pads 20 and the bottoms 50 of the pair of side cleaning pads 20, respectively.

The one end of each hook portion 58 of each hook and loop connector 56 of the pair of side cleaning pads 20 has a male connector portion 64 thereat, while the associated one of the tops 48 of the pair of side cleaning pads 20 and the bottoms 50 of the pair of side cleaning pads 20, respectively, has a female connector portion 66 thereat.

The female connector portion 66 of each hook and loop connector 56 of the pair of side cleaning pads 20 replaceably receives the male connector portion 64 of an associated hook and loop connector 56 of the pair of side cleaning pads 20 so as to allow the two pair of hook and loop connectors 56 of the pair of side cleaning pads 20 to be unhooked to service the pair of side cleaning pads 20, the front tray 26, etc.

The loop portion 60 of each hook and loop connector 56 of the pair of side cleaning pads 20 is an elastic cord 68 so as to maintain the pair of side cleaning pads 20 in static equilibrium and biased towards each other for facilitating cleaning the pet 16 when the pet 16 passes between the pair of side cleaning pads 20 by having the pair of side cleaning pads 20 biased against the pet 16.

F. Impressions.

It will be understood that each of the elements described above or two or more together may also find a useful application in other types of constructions differing from the types described above.

While the embodiments of the present invention have been illustrated and described as embodied in a pet cleaning device for resting on a support surface, for replaceably attaching around, and communicating with, a pet door, and for isolating and cleaning a pet after the pet has passed through the pet door, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A cleaning device for resting on a support surface, for replaceably attaching around, and communicating with, a pet door, and for isolating and cleaning a pet after the pet has passed through the pet door, comprising:
   a) a tunneled enclosure;
   b) a pair of side cleaning pads;
   wherein said tunneled enclosure is for resting on the support surface;
   wherein said tunneled enclosure is for replaceably attaching around the pet door;
   wherein said tunneled enclosure is for communicating with the pet door;
   wherein said tunneled enclosure is for isolating the pet;
   wherein said pair of side cleaning pads are within said tunneled enclosure;
   wherein said pair of side cleaning pads are operatively connected to said tunneled enclosure;
   wherein said pair of side cleaning pads are for cleaning the pet after the pet has passed through the pet door and has advanced to between said pair of side cleaning pads;
   wherein said tunneled enclosure comprises:
   a) a bottom wall;
   b) a top wall;
   c) a pair of side walls;
   d) a back; and
   e) a front;
   wherein said pair of side cleaning pads comprise four pair of hook and loop connectors;
   wherein said pair of side cleaning pads have tops;
   wherein two pair of hook and loop connectors of said pair of side cleaning pads depend from said top wall of said tunneled enclosure to said tops of said pair of side cleaning pads, respectively;
   wherein said pair of side cleaning pads have bottoms;
   wherein the other two pair of hook and loop connectors of said pair of side cleaning pads depend from said bottoms of said pair of side cleaning pads to said bottom wall of said tunneled enclosure;
   wherein each hook and loop connector of said pair of side cleaning pads comprises:
   a) a hook portion; and
   b) a loop portion; and
   wherein each hook portion of each hook and loop connector of said pair of side cleaning pads has one end thereof replaceably attached to said tops of said pair of side cleaning pads and said bottoms of said pair of side cleaning pads, respectively a rear tray, wherein said rear tray is slidably attached within said tunneled enclosure, wherein said rear tray removably receives a replaceable wet sponge, wherein said replaceable wet sponge of said rear tray removably sits in said rear tray; and wherein said replaceable wet sponge of said rear tray is for washing the paws of the pet as the pet passes thereby and steps therein; a front tray, wherein said front tray is slidably attached within said tunneled enclosure, wherein said front tray removably receives a replaceable dry sponge, wherein said replaceable dry sponge of said front tray removably sits in said front tray, and wherein said replaceable dry sponge of said front tray is for drying the paws of the pet that have been wetted by said replaceable wet sponge of said rear tray as the pet passes thereby and steps therein.

2. The cleaning device of claim 1, wherein said bottom wall of said tunneled enclosure is flat; and
   wherein said bottom wall of said tunneled enclosure is for resting on the support surface.

3. The cleaning device of claim 2, wherein said top wall of said tunneled enclosure is flat.

4. The cleaning device of claim 3, wherein said top wall of said tunneled enclosure is disposed above said bottom wall of said tunneled enclosure.

5. The cleaning device of claim 4, wherein said top wall of said tunneled enclosure is parallel to said bottom wall of said tunneled enclosure.

6. The cleaning device of claim 5, wherein said top wall of said tunneled enclosure is aligned with said bottom wall of said tunneled enclosure.

7. The cleaning device of claim 6, wherein said pair of side walls of said tunneled enclosure are spaced-apart from each other.

8. The cleaning device of claim 7, wherein said pair of side walls of said tunneled enclosure bow outwardly away from each other.

9. The cleaning device of claim 8, wherein said pair of side walls of said tunneled enclosure are mirror images of each other.

10. The cleaning device of claim 9, wherein said pair of side walls of said tunneled enclosure connect said bottom wall of said tunneled enclosure to said top wall of said tunneled enclosure.

11. The cleaning device of claim 10, wherein said back of said tunneled enclosure is for replaceably attaching around the pet door; and
wherein said back of said tunneled enclosure has an opening that communicates with the pet door when the pet door has been opened by the pet passing therethrough.

12. The cleaning device of claim 11, wherein said back of said tunneled enclosure has a pair of tracks.

13. The cleaning device of claim 12, wherein said pair of tracks of said back of said tunneled enclosure are vertically oriented.

14. The cleaning device of claim 13, wherein said pair of tracks of said back of said tunneled enclosure are spaced-apart from each other.

15. The cleaning device of claim 14, wherein said pair of tracks of said back of said tunneled enclosure are mirror images of each other.

16. The cleaning device of claim 15, wherein said pair of tracks of said back of said tunneled enclosure are generally L-shaped.

17. The cleaning device of claim 16, wherein said pair of tracks of said back of said tunneled enclosure open towards each other.

18. The cleaning device of claim 17, wherein said pair of tracks of said back of said tunneled enclosure straddle said opening in said back of said tunneled enclosure.

19. The cleaning device of claim 18, further comprising a pair of cooperating tracks.

20. The cleaning device of claim 19, wherein said pair of cooperating tracks are vertically oriented.

21. The cleaning device of claim 20, wherein said pair of cooperating tracks are spaced-apart from each other.

22. The cleaning device of claim 21, wherein said pair of cooperating tracks are mirror images of each other.

23. The cleaning device of claim 22, wherein said pair of cooperating tracks are generally L-shaped.

24. The cleaning device of claim 23, wherein said pair of cooperating tracks open away from each other.

25. The cleaning device of claim 24, wherein said pair of cooperating tracks straddle the pet door.

26. The cleaning device of claim 25, wherein said pair of cooperating tracks slidably receive said pair of tracks of said back of said tunneled enclosure so as to allow said tunneled enclosure to be slid down and communicate with the pet door and be readily removable from around the pet door.

27. The cleaning device of claim 26, wherein one side wall of said tunneled enclosure has an opening.

28. The cleaning device of claim 27, wherein said opening in said one side wall of said tunneled enclosure extends partially upwardly from said bottom wall of said tunneled enclosure and partially forwardly from said back of said tunneled enclosure; and
wherein said opening in said one side wall of said tunneled enclosure provides access to service said rear tray.

29. The cleaning device of claim 28, wherein said front wall of said tunneled enclosure is opened for allowing the pet to exit said tunneled enclosure therethrough.

30. The cleaning device of claim 29, wherein said pair of side cleaning pads bow outwardly away from each other.

31. The cleaning device of claim 30, wherein said pair of side cleaning pads are mirror images of each other.

32. The cleaning device of claim 31, wherein said pair of side cleaning pads open towards each other.

33. The cleaning device of claim 32, wherein said pair of side cleaning pads are aligned with each other.

34. The cleaning device of claim 33, wherein said pair of side cleaning pads are spaced-apart from each other for allowing the pet to pass therebetween and be cleaned thereby.

35. The cleaning device of claim 34, wherein said pair of side cleaning pads have facing surfaces;
wherein said facing surfaces of said pair of side cleaning pads are microfiber fingers; and
wherein said microfiber fingers of said facing surfaces of said pair of side cleaning pads are for facilitating cleaning the pet when the pet passes between said pair of side cleaning pads.

36. The cleaning device of claim 1, wherein said four pair of hook and loop connectors of said pair of side cleaning pads suspend said pair of side cleaning pads within said tunneled enclosure.

37. The cleaning device of claim 36, wherein said four pair of hook and loop connectors of said pair of side cleaning pads maintain said pair of side cleaning pads in static equilibrium and biased towards each other for facilitating cleaning the pet when the pet passes between said pair of side cleaning pads by having said pair of side cleaning pads biased against the pet.

38. The cleaning device of claim 1, wherein said hook portion of each hook and loop connector of said pair of side cleaning pads are disposed on said tops of said pair of side cleaning pads and said bottoms of said pair of side cleaning pads, respectively.

39. The cleaning device of claim 38, wherein said loop portion of each hook and loop connector of said pair of side cleaning pads are disposed on said top wall of said tunneled enclosure and said bottom wall of said tunneled enclosure, respectively.

40. The cleaning device of claim 1, wherein said one end of each hook portion of each hook and loop connector of said pair of side cleaning pads has a male connector portion thereat.

41. The cleaning device of claim 40, wherein said tops of said pair of side cleaning pads and said bottoms of said pair of side cleaning pads have female connector portions thereat.

42. The cleaning device of claim 41, wherein said female connector portion of each hook and loop connector of said pair of side cleaning pads, respectively, replaceably receives said male connector portion of an associated hook and loop connector of said pair of side cleaning pads so as to allow said two pair of hook and loop connectors of said pair of side cleaning pads to be unhooked to service said cleaning device.

43. The cleaning device of claim 42, wherein said loop portion of each hook and loop connector of said pair of side cleaning pads is an elastic cord so as to maintain said pair of side cleaning pads in static equilibrium and biased towards each other for facilitating cleaning the pet when the pet passes between said pair of side cleaning pads by having said pair of side cleaning pads biased against the pet.

\* \* \* \* \*